115,484

UNITED STATES PATENT OFFICE.

JOHN MICHAEL KELLER, OF EVANSVILLE, INDIANA.

IMPROVEMENT IN COMPOUNDS FOR STAINING WOOD.

Specification forming part of Letters Patent No. 115,484, dated May 30, 1871.

*To all whom it may concern:*

Be it known that I, JOHN MICHAEL KELLER, of Evansville, in the county of Vanderburg and State of Indiana, have invented a new and valuable Improvement in Wood-Staining Compounds; and I do hereby declare that the following is a full, clear, and exact description of the composition and ingredients of the same.

My invention relates to means for staining furniture; and consists in combining and compounding a mixture of distilled water, extract of log-wood, gum catechu, bichromate of potash, concentrated lye, copperas, and resin, intended to serve as an efficient and cheap walnut-stain when prepared in the manner hereinafter described.

To make one gallon of stain, take one gallon of rain-water and add two and one-half ounces of extract of logwood and three and one-half ounces of gum catechu. The mixture is placed on a hot stove and heated moderately, being, at the same time, stirred two or three times. When the mass is dissolved add one and one-quarter dram of bichromate of potash. When the bichromate of potash is dissolved add three drams of concentrated lye. Stir the mixture occasionally for about ten minutes. Then, after removing the foam or froth from the mass, add four drams of pulverized resin gradually while the mixture is hot, and stir the whole mass for about ten minutes. The mixture should be allowed to settle for a couple of days, when it will be ready for use.

Stain made with the above ingredients and mixed in the manner specified will make a dark brown color on the wood.

This stain may be applied on wood of every description, in a hot, warm, or cold state.

To make a stain of a lighter color, use more water and concentrated lye. For a darker color, use more extract of logwood and bichromate of potash; or copperas may be employed in place of bichromate of potash for a light or middle shade of walnut color, when desired.

After staining the furniture it should be covered with a coating of shellac and varnish.

Any desired shade can be produced by varying the proportions of the ingredients.

I claim as my invention—

The compound for staining wood herein described, compounded in the manner, of the ingredients, and in the proportions specified.

In testimony that I claim the above I have hereunto subscribed my name in the presence of two witnesses.

JOHN MICHAEL KELLER.

Witnesses:
FRANK OSTERMANN,
WM. BAKER.